Feb. 9, 1954   T. A. DERMODY ET AL   2,668,539
ANIMAL DELIVERY INSTRUMENT
Filed March 9, 1953
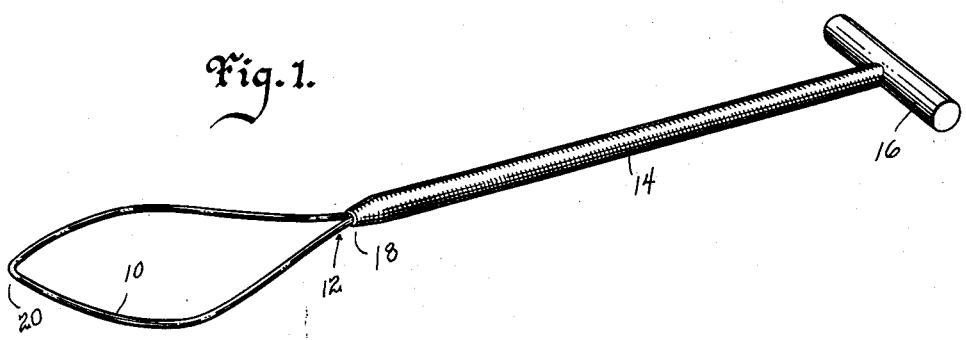
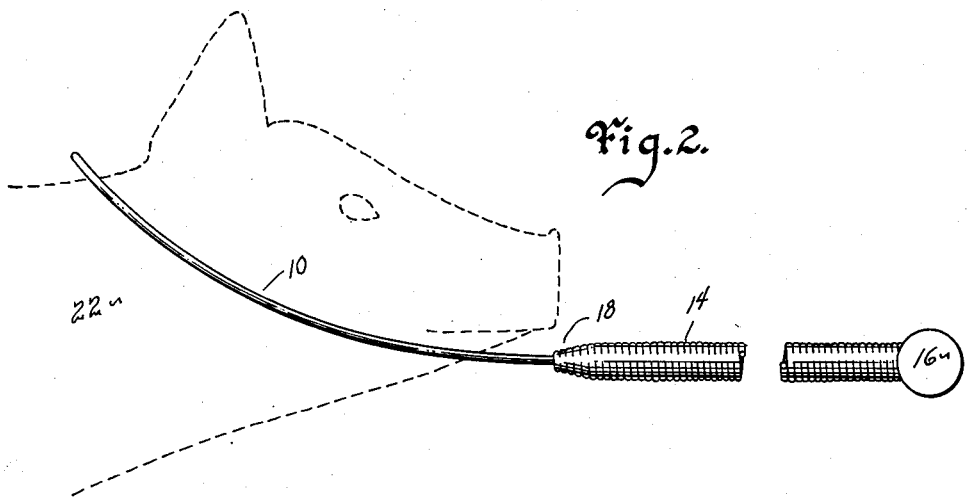
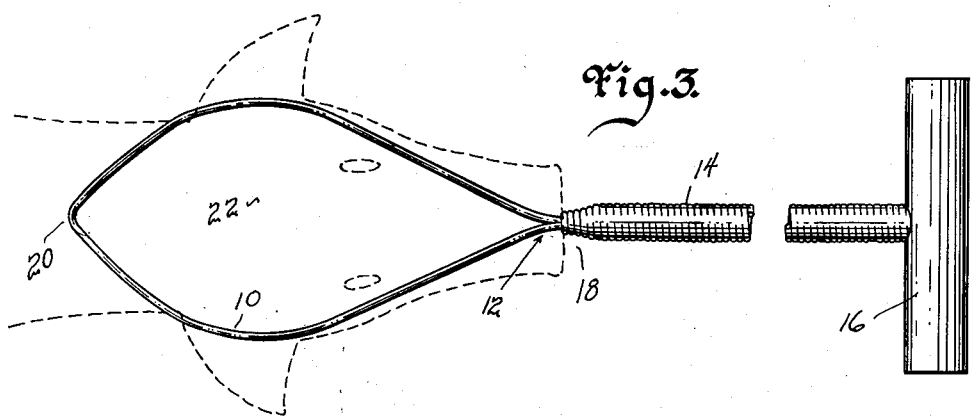
Inventors
Thomas A. & John M. Dermody
by M. Talbert Dick
Attorney
Witness
Edward P. Seeley Patented Feb. 9, 1954

2,668,539

UNITED STATES PATENT OFFICE 2,668,539

ANIMAL DELIVERY INSTRUMENT

Thomas A. Dermody and John M. Dermody, Breda, Iowa

Application March 9, 1953, Serial No. 341,004

4 Claims. (Cl. 128—361)

Our invention is an instrument that greatly facilitates the delivery of animals attempting to be born head first.

To our knowledge the is no instrument available that provides the veterinarian with the mechanical aid he should have to aid a young pig, for example, to be born in a head first delivery. Many potential sources of income are lost to breeders by reason of this lack in the art. An instrument that will not harm either the mother or the young and yet will permit the veterinarian to aid directly in the delivery, is, therefore, much to be desired.

In view of the foregoing it is the principal object of our invention to provide an animal delivery instrument that will aid the veterinarian in the head first delivery of animals.

It is a further object of our invention to provide an animal delivery instrument that will injure neither the mother nor the young as it is being used.

It is a still further object of our invention to provide an animal delivery instrument that is sufficiently rigid longitudinally to make its insertion into the mother relatively easy.

It is a further object of our invention to provide an animal delivery instrument that is laterally flexible.

It is a further object of our invention to provide an animal delivery instrument that is laterally resilient.

It is a further object of our invention to provide an animal delivery instrument that is simple and rugged in construction, durable in use, and refined in appearance.

These and other objects will be apparent to those skilled in the art.

Our invention consists in the construction, arrangement and combination of the various parts of the device, whereby the objects contemplated are attained as hereinafter more fully set forth, and specifically pointed out in our claims, and illustrated in the accompanying drawings, in which:

Fig. 1 is a perspective view of our animal delivery instrument,

Fig. 2 is an enlarged side elevation view of our animal delivery instrument in use on a pig head shown in broken lines. A portion of our instrument has been omitted to conserve space, and Fig. 3 is an enlarged plan view of our instrument shown in use on a pig head illustrated with broken lines and a portion of the instrument is omitted to conserve space.

Referring to the drawings we have used the numeral 10 to designate the relatively stiff spring strand head engaging loop advantageously constructed of a spring wire, of our instrument the ends of which approach closely adjacent to each other at 12 in Figs. 1 and 3. The shanks then enter the spring and extend through its length to a suitable handle such as the T-bar 16. Spring 14 is securely fastened to the handle as by welding or the like but is secured to the wire directly solely by embracing it and indirectly, of course, by reason of the fact that both are secured to the handle. The spring 14 is normally fully retracted so that its separate coils are in contact with each other. It supplies the necessary rigidity to the shanks of wire loop 10, therefore, with respect to compression forces to permit insertion into the mother animal. At the same time the spring and wire can be bent laterally, and the spring provides resilience to return the shanks to a straight position when lateral pressure is relieved. In the interest of brevity this spring will hereinafter be referred to as a retracted spring thereby suggesting the normal positions of the coils in physical engagement with each other. The end of the spring designated 18 adjacent to the loop is of reduced proportions and prevents more than a slight tendency of the loop 10 to be forced into the spring during the insertion of the instrument. Also, of course, any movement of the loop toward the spring exerts a collapsing pressure on the loop which aids in the entry of the instrument into the mother. In other words the spring and shanks of the spring strand together form a laterally flexible and resilient connection between said handle and said loop that is rigid relative to pure compression forces and will yield only very slightly to tension forces. The numeral 20 designates a rather abrupt bend or blunt point formed at the portion of the loop most remote from the handle 16. This pointed end aids in starting the intsrument into the sow for example or other mother animal. The loop itself curves relative to the longitudinal axis of the instrument. The purpose of this curve is to permit the loop to be manipulated over the head of the baby animal attempting to be born as illustrated in Figs. 2, and 3, in which the loop is the head of a pig 22 and extends around behind the ears. The loop because it is curved extends downwardly under the chin of the animal and to the wire shanks and spring which continue straight to the handle which the veterinarian grips in order to pull the young animal from its mother. As a pull is exerted on the handle, the loop tightens about the neck sufficiently to prevent the loop from slipping over the head. At the same time the wire has sufficient resilience to prevent strangulation or other injury to the baby being delivered. Because the wire of loop 10 throughout its straight shank portions is surrounded by spring 14, loop 10 is forced into the mother rather easily. Nevertheless the freedom of side motion of handle 16, that is often necessary to the veterinarian making the delivery, is not interfered with to any noticeable extent.

From the foregoing it should be clear that we have invented an animal delivery instrument that achieves the objects of our invention.

Some changes may be made in the construction and arrangement of our animal delivery instrument without departing from the real spirit and purpose of our invention, and it is our intention to cover by our claims, any modified forms of structure or use of mechanical equivalents which may be reasonably included within their scope.

We claim:

1. In an animal delivery instrument, a spring wire loop having shank portions that extend from said loop adjacent to each other, a retracted spring embracing the loop shank portions of said spring wire loop, and a handle secured to both said spring and said spring wire loop shank portions at their ends most remote from said spring wire loop.

2. In an animal delivery instrument, a spring wire loop having shank portions that extend from said loop adjacent to each other, a retracted spring embracing the loop shank portions of said spring wire loop, and a handle secured to both said spring and said spring wire loop shank portions at their ends most remote from said spring wire loop; said spring wire loop being curved relative to the longitudinal axis of the entire instrument.

3. In an animal delivery instrument, a spring wire loop having shank portions that extend from said loop adjacent to each other, a retracted spring embracing the loop shank portions of said spring wire loop, and a handle secured to both said spring and said spring wire loop shank portions at their ends most remote from said spring wire loop; said spring wire loop being curved relative to the longitudinal axis of the entire instrument; said spring wire loop having a blunt point formed in it at the place thereon most removed from said handle.

4. In an animal delivery instrument, a spring wire loop having shank portions that extend from said loop adjacent to each other, a retracted spring embracing the loop shank portions of said spring wire loop, and a handle secured to both said spring and said spring wire loop shank portions at their ends most remote from said spring wire loop; said spring wire loop having a blunt point formed in it at the place thereon most removed from said handle.

THOMAS A. DERMODY.
JOHN M. DERMODY.

References Cited in the file of this patent

UNITED STATES PATENTS

| Number | Name | Date |
|---|---|---|
| 1,054,960 | Butner | Mar. 4, 1913 |
| 1,545,294 | Westerhold | July 7, 1925 |

FOREIGN PATENTS

| Number | Country | Date |
|---|---|---|
| 34,419 | Denmark | Apr. 20, 1925 |